United States Patent
Stuart (10) Patent No.: US 8,597,145 B2
(45) Date of Patent: Dec. 3, 2013

(54) TORQUE TRANSFER UNIT WITH INTEGRATED ELECTRIC DRIVE MOTOR

(75) Inventor: Charles G. Stuart, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 327 days.

(21) Appl. No.: 13/050,001

(22) Filed: Mar. 17, 2011

(65) Prior Publication Data

US 2012/0238387 A1    Sep. 20, 2012

(51) Int. Cl.
| | |
|---|---|
| F16H 3/72 | (2006.01) |
| F16H 37/06 | (2006.01) |
| B60K 1/00 | (2006.01) |
| B60K 16/00 | (2006.01) |
| F16D 19/00 | (2006.01) |
| F16D 27/00 | (2006.01) |
| F16D 37/02 | (2006.01) |

(52) U.S. Cl.
USPC ............... 475/5; 475/6; 180/65.1; 180/65.31; 192/84.96

(58) Field of Classification Search
USPC ............................... 475/1–10, 150, 231, 249; 180/65.1–65.235; 192/84.96
See application file for complete search history.

(56) References Cited

U.S. PATENT DOCUMENTS

| | | |
|---|---|---|
| 4,643,282 A | 2/1987 | Edl |
| 5,482,512 A | 1/1996 | Stevenson |
| 5,558,175 A | 9/1996 | Sherman |
| 5,911,291 A | 6/1999 | Suetake et al. |
| 5,935,035 A | 8/1999 | Schmidt |
| 6,098,770 A | 8/2000 | Isley, Jr. |
| 6,318,532 B1 * | 11/2001 | Gassmann ...................... 192/35 |
| 6,474,428 B1 * | 11/2002 | Fujikawa et al. .......... 180/65.25 |
| 6,527,658 B2 | 3/2003 | Holmes et al. |
| 6,746,354 B1 | 6/2004 | Ziemer |
| 7,022,038 B2 | 4/2006 | Schmidt et al. |
| 7,172,525 B2 | 2/2007 | Sowul et al. |
| 7,175,557 B2 | 2/2007 | Kirkwood et al. |
| 7,235,029 B2 | 6/2007 | Klemen et al. |
| 7,278,941 B2 | 10/2007 | Holmes et al. |
| 7,314,424 B2 | 1/2008 | Supina et al. |
| 7,339,300 B2 | 3/2008 | Burgman et al. |
| 7,402,923 B2 | 7/2008 | Klemen et al. |
| 7,416,501 B2 | 8/2008 | Holmes et al. |
| 7,427,252 B2 | 9/2008 | Holmes |
| 7,717,817 B2 | 5/2010 | Raghavan et al. |

(Continued)

FOREIGN PATENT DOCUMENTS

JP    2009261214 A  *  11/2009

*Primary Examiner* — Tisha Lewis
(74) *Attorney, Agent, or Firm* — Harness, Dickey & Pierce, P.L.C.

(57) ABSTRACT

An axle assembly comprises a power transmission device including a housing having a cylindrically shaped sidewall. The power transmission device selectively communicates rotatable motion from an input member to an output member. A frictional clutch is disposed in the housing and includes a drum. A first and a second axle shaft selectively drive a first and a second drive wheel, respectively. A differential selectively transfers drive torque from the output member to at least one of the first and second axle shafts. An electric motor comprising a coil and a plurality of magnets is provided on the axle assembly. In one example, the coil is disposed on the housing and the magnets are disposed on the drum. The coil is configured to selectively energize to provide one of a positive or negative torque input to the output member.

17 Claims, 5 Drawing Sheets

(56) References Cited

U.S. PATENT DOCUMENTS

| | | |
|---|---|---|
| 7,833,119 B2 | 11/2010 | Klemen et al. |
| 2008/0093135 A1* | 4/2008 | Nomura et al. .............. 180/65.2 |
| 2008/0251344 A1 | 10/2008 | Ochiai et al. |
| 2009/0100965 A1* | 4/2009 | Sanji et al. .................. 74/606 R |
| 2010/0109461 A1* | 5/2010 | Kato et al. ....................... 310/90 |
| 2012/0080286 A1* | 4/2012 | Kasuya et al. ............. 192/113.3 |

\* cited by examiner

TORQUE TRANSFER UNIT WITH INTEGRATED ELECTRIC DRIVE MOTOR

FIELD

The present disclosure relates generally to axle assemblies. More particularly, the present disclosure is directed to an axle assembly having a power transmission device equipped with a friction clutch and an electric motor drivably coupled to a component of the friction clutch to selectively provide positive or negative torque to assist in vehicle operation.

BACKGROUND

This section provides background information related to the present disclosure which is not necessarily prior art.

Due to increased demand for four-wheel drive and all-wheel drive vehicles, many power transmission systems are being incorporated into vehicle driveline applications for transferring drive torque to the wheels. Many vehicles include a power transmission device operably installed between the primary and secondary drivelines. Such power transmission devices are typically equipped with a torque transfer mechanism for selectively transferring drive torque from the primary driveline to the secondary driveline to establish a four-wheel drive mode of operation.

Some power transmission devices are operable for automatically directing drive torque to the secondary wheels without any input or action on the part of the vehicle operator. When traction is lost at the primary wheels, a clutch is actuated for transferring torque to the secondary wheels to establish the four-wheel drive mode. Some power transmission devices are equipped with an electrically-controlled clutch actuator operable to regulate the amount of drive torque transferred across the clutch to the secondary driveline as a function of changes in vehicle operating characteristics such as vehicle speed, throttle position, and steering angle. While many power transmission devices are currently used in four-wheel drive vehicles, a need exists to advance the technology.

SUMMARY

This section provides a general summary of the disclosure, and is not a comprehensive disclosure of its full scope or all of its features.

An axle assembly comprises a power transmission device including a housing. In some examples, the housing can have a cylindrically shaped sidewall. The power transmission device selectively communicates rotatable motion from an input member to an output member. A friction clutch is disposed in the housing and can be actuated to selectively transfer torque between the input member and the output member. The friction clutch includes a first clutch member and a second clutch member. The first clutch member is operatively coupled to the input member while the second clutch member is operatively coupled to the output member. First and second axle shafts drive first and second drive wheels, respectively. A differential transfers drive torque from the output member to at least one of the first and second axle shafts. An electric motor comprising a coil and a plurality of magnets is provided on the axle assembly. In one example, the coil is disposed on the housing and the magnets are disposed on the second clutch member. The coil can be selectively energized to provide one of a positive or negative torque input to the output member.

According to other features, the first and second axle shafts are rear axle shafts. The coil is arranged on the cylindrically shaped sidewall of the housing. The first clutch member is a clutch hub and the second clutch member is a cylindrical clutch drum. The magnets are disposed on an outer cylindrical surface of the drum. The frictional clutch is a wet clutch.

According to other features, the power transmission device is configured to operate in various drive modes. For example, the power transmission device can operate in an electric motor assist drive mode wherein the electric motor is energized and provides either a positive or negative torque to the output shaft. The power transmission device is further configured to operate in an electric drive mode wherein the friction clutch of the power transmission device is not coupled and wherein the electric motor is energized and provides a sole torque input to the output shaft. The power transmission device is further configured to operate in a regenerative drive mode wherein the electric motor provides a braking input to the power transmission device and wherein the braking input provides a regenerative input to a battery. According to one example, the differential is a rear differential.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The present invention will become more fully understood from the detailed description and the accompanying drawings wherein.

Corresponding reference numerals indicate corresponding parts throughout the several views of the drawings.

DETAILED DESCRIPTION

Example embodiments will now be described more fully with reference to the accompanying drawings.

The following description of the preferred embodiments is merely exemplary in nature and is in no way intended to limit the invention, its application, or uses.

The present invention is directed to an axle assembly including a torque transfer unit or power transmission device that may be adaptively controlled for modulating the torque transferred between a rotatable input member and a rotatable output member. The power transfer device may be useful within motor vehicle drivelines as a stand-alone device that may be easily incorporated between sections of propeller shafts, directly coupled to a drive axle assembly, or other in-line torque coupling applications. Accordingly, while the present invention is hereinafter described in association with a specific structural embodiment for use in a driveline application, it should be understood that the arrangement shown and described is merely intended to illustrate an exemplary embodiment of the present invention.

Figure 1:
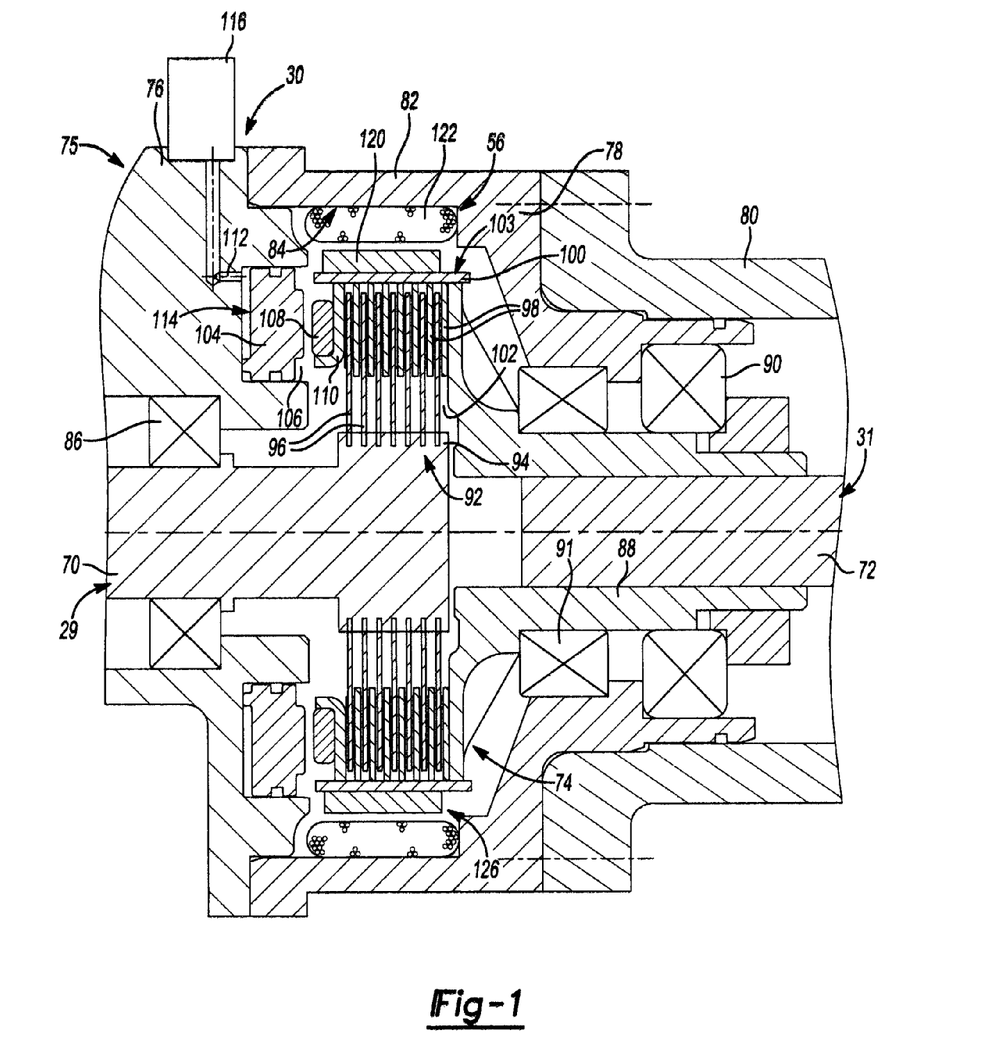
FIG. 1 is a cross-sectional side view of a power transmission device incorporating an electric motor and constructed in accordance to one example of the present teachings.
Figure 2:
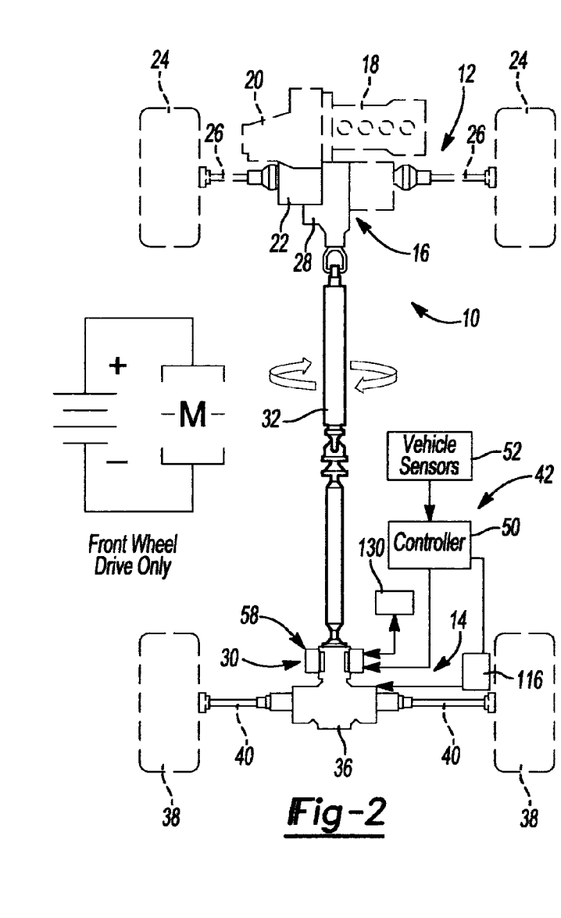
FIG. 2 is a schematic of a four-wheel drive vehicle equipped with the power transmission device of FIG. 1 and shown in a first drive mode.

With initial reference to FIGS. 1 and 2 of the drawings, a drive train 10 for a four-wheel vehicle is shown. Drive train 10 includes a first axle assembly 12, a second axle assembly 14, and a powertrain assembly 16 for generating and delivering drive torque to the axle assemblies 12 and 14, respectively. In the particular arrangement shown, the first axle assembly 12 is the front axle while the second axle assembly 14 is the rear axle. The powertrain assembly 16 includes an engine 18 and a multi-speed transmission 20 having an integrated front differential unit 22 for driving front wheels 24 via front axle shafts 26. The powertrain assembly 16 further includes a transfer unit 28 driven by the transmission 20 for delivering torque to an input member 29 of a torque transfer unit or power transmission device 30 via a drive shaft assembly 32. The input member 29 of the power transmission device 30 is coupled to the drive shaft assembly 32 while its output member 31 is arranged to drive a rear differential 36. The second axle assembly 14 also includes a pair of rear wheels 38 that are connected to the rear differential 36 via rear axle shafts 40.

The drive train 10 is shown to include an electronically-controlled power transfer system 42 that includes the power transmission device 30. The power transfer system 42 is operable to selectively provide drive torque in a two-wheel drive mode or a four-wheel drive mode. In the two-wheel drive mode, torque is not transferred via the power transmission device 30. Accordingly, 100% of the drive torque delivered by the transmission 20 is provided to the front wheels 24. In the four-wheel drive mode, power is transferred through the power transmission device 30 to supply drive torque to the rear wheels 38. The power transfer system 42 further includes a controller 50 that is in communication with vehicle sensors 52 for detecting dynamic and operational characteristics of the motor vehicle. The vehicle sensors 52 can include, but are not limited to, sensors that can determine wheel speed, wheel slip, steering wheel angle, yaw rate, throttle position, engine/transmission torque, vehicle speed, stability control status, etc.

The controller 50 is operable to control actuation of the power transmission device 30 in response to signals from the vehicle sensors 52. The controller 50 may be programmed with a predetermined target torque split between the first and the second set of wheels 24 and 38, respectively. Alternatively, the controller 50 may function to determine the desired torque to be transferred through the power transmission device 30 via other methods. Regardless of the method used for determining the magnitude of torque to transfer, the controller 50 operates the power transmission device 30 to maintain the desired torque magnitude. As will become further appreciated from the following discussion, the controller 50 may also communicate with an electric motor 56 that is arranged on the power transmission device 30 for providing positive or negative torque in various drive modes to assist in vehicle operation.

With specific attention now to FIG. 1, the power transmission device 30 will be described in greater detail. The input member 29 is shown to include an input shaft 70 while the output member 31 is shown to include an output shaft 72. The output shaft 72 is preferably a pinion shaft having a pinion meshed with a ring gear on the rear differential 36. The power transmission device 30 also includes a friction clutch 74 that is operably dispersed between the input shaft 70 and the output shaft 72. The power transmission device 30 also includes a housing assembly 75 that comprises a front housing 76 and a substantially cup-shaped rear housing 78. The rear housing 78 can be supported on an axle carrier 80. The rear housing 78 includes a generally cylindrically shaped side wall 82 that has an inner circumferential surface 84. The input shaft 70 is supported in the front housing 76 by a bearing 86. The output shaft 72 is received by a tubular output spindle 88 that is supported in the rear housing 78 by bearings 90 and 91.

The input shaft 70 includes a raised splined portion 92 defining a clutch hub 94. A set of inner friction plates 96 are drivingly coupled to the clutch hub 94 via a splined engagement. The inner friction plates 96 are interleaved with a plurality of outer friction plates 98. The outer friction plates 98 are in splined engagement with a clutch drum 100. The drum 100 is generally cylindrically shaped and defines an inner cavity 102 within which the interleaved friction plates are located. The drum 100 further includes an outer circumferential surface 103. The outer circumferential surface 103 opposes the inner circumferential surface 84 of the side wall 82. The drum 100 is drivingly coupled to a radial flange portion of the output spindle 88. The output spindle 88 is coupled for rotation with the output shaft 72 via another splined interface. In the embodiment depicted, the friction clutch 74 is a wet clutch. Accordingly, clutch fluid is contained within the cavity 102 defined by the drum 100 and is in communication with the friction plates 96 and 98. Fluid is also contained within the housing assembly 75.

A piston 104 is slidably positioned within a cavity 106 that is formed within the housing assembly 75. The piston 104 is axially movable into engagement with a thrust bearing 108 and an apply plate 110. Pressurized fluid can flow through a conduit 112 formed in the front housing 76 and act on a front face 114 of the piston 104. Other configurations are contemplated. When pressurized fluid builds on the face 114 of the piston 104, the piston 104 translates and applies a force through the thrust bearing 108 and the apply plate 110 to the plurality of interleaved clutch plates 96 and 98. Torque is transferred between the input shaft 70 and the output shaft 72 via the components previously described when the friction plates 96 and 98 are forced into contact with one another. A hydraulic powerpack 116 is schematically shown in FIGS. 1 and 2 and is arranged to provide a controllable source of pressurized fluid to conduit 112. Regulation of the fluid pressure in conduit 112 acts to proportionally regulate the clutch engagement force applied by piston 104 to apply plate 110 which, in turn, regulates the drive torque transferred from input shaft 70 to output shaft 72. Controller 50 is shown to communicate with hydraulic powerpack 116 and is operable to control the fluid pressure generated by the hydraulic powerpack 116. While not limited thereto, the powerpack 116 can include a motor-driven fluid pump and valving for controlling the fluid pressure delivered to conduit 112.

The electric motor 56 generally includes a plurality of magnets 120 and a coil 122. In the example shown, the magnets 120 are fixedly mounted on the outer circumferential surface 103 of the drum 100 for concurrent rotation therewith. The magnets 120 can be a plurality of magnets arranged around the outer circumferential surface 130 of the drum 100. In this regard, the magnets 120 can use the drum 100 as a rotor. The coil 122 is fixedly mounted onto the inner circumferential surface 84 of the rear housing 78. The electric motor 56 can therefore occupy a space defined by an annular pocket 126 defined generally between the cylindrically shaped side wall 82 of the rear housing 78 and the outer circumferential surface of the drum 100. The electric motor 56 can receive power from an on-board battery source 130 and/or other power sources such as the vehicle's alternator. The coil 122 can be energized to cause the magnets 120 and therefore the drum 100 to rotate in a first direction that corresponds to a forward rotation of the drive axle 14 or a second direction that corresponds to a reverse rotation of the drive axle 14. It is appreciated that in some examples, as described herein, the resultant torque input from the electric motor 56 can supplement (positively or negatively) the drive torque already supplied by the engine 18 through the input shaft 70.

As will be described in the following discussion directed towards FIGS. 2-6, the electric motor 56 adds functionality to the power transmission device 30 and can be active or inactive in various drive modes. In this regard, the controller 50 can, in addition to controlling actuation of the friction clutch 74, send a signal to the electric motor 56 to activate and deactivate the electric motor 56 according to various inputs from the vehicle sensors 52. It is contemplated that the controller 50 can be configured to automatically activate and deactivate the electric motor 56 based on driving conditions or alternatively from a driver initiated input (i.e., drive mode selector switch, etc.).

As shown in FIG. 2, the power transmission device 30 is decoupled to define a first drive mode. More specifically, the friction clutch 74 is not engaged. In this regard, drive torque is not transmitted from the input shaft 70 to the output shaft 72. In addition, the electric motor 56 is inactive. With the power transmission device 30 operating in the first drive mode, the drive train 10 operates in a front wheel drive mode such that power is communicated only to the front wheels 24 via the powertrain 16.

Figure 3:
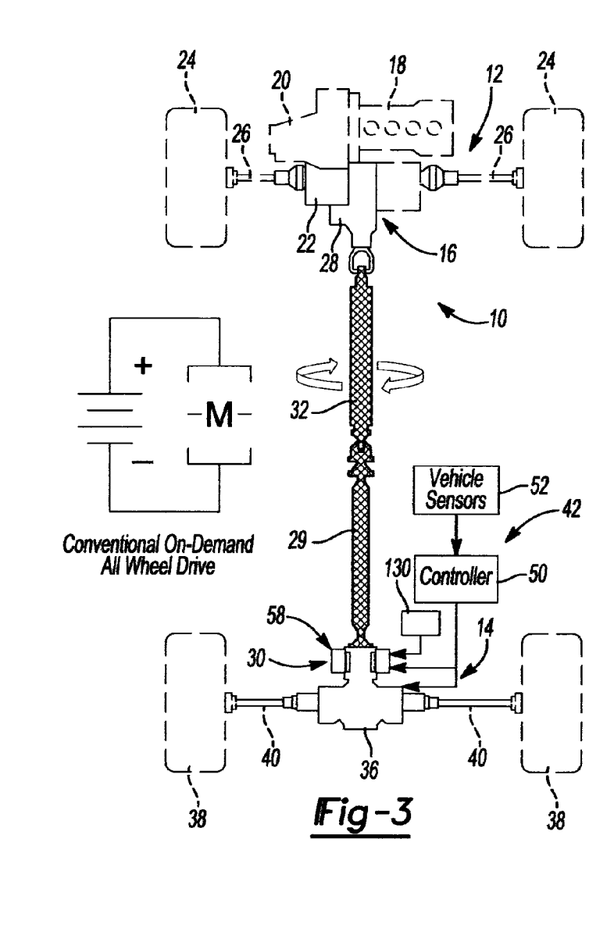
FIG. 3 is a schematic of a four-wheel drive vehicle equipped with the power transmission device of FIG. 1 and shown in a second drive mode.

Turning now to FIG. 3, the power transmission device 30 is shown in a second drive mode. In the second drive mode, the friction clutch 74 of the power transmission device 30 is at least partially engaged such that drive torque is transferred from the input shaft 70 to the output shaft 72 to provide power to the rear wheels 38 through the rear differential 36. In the second drive mode, the drive train 10 is operating in a conventional on-demand all wheel drive mode. In the second mode as illustrated in FIG. 3, the electric motor 56 is inactive.

Figure 4:
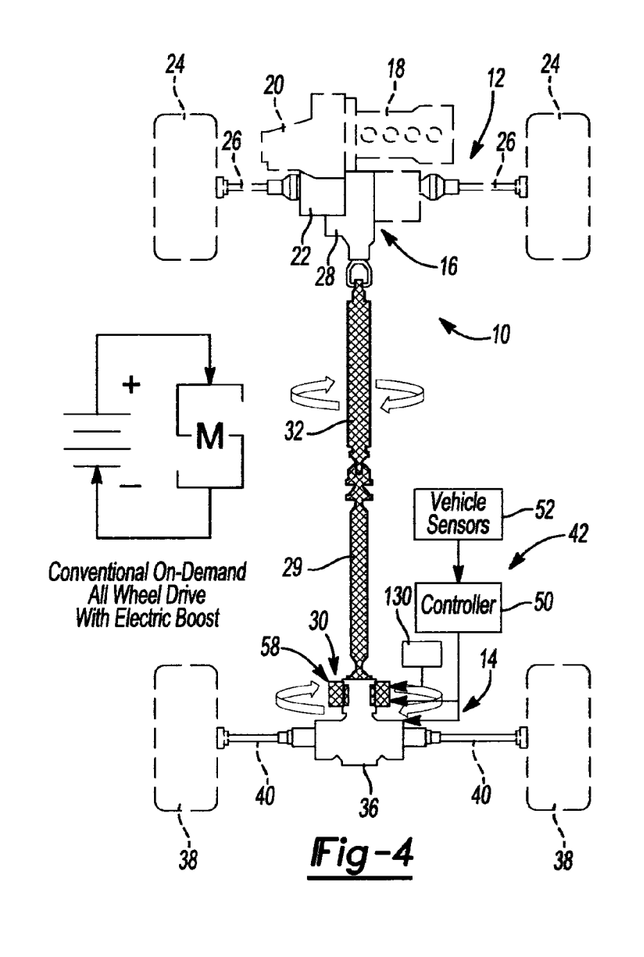
FIG. 4 is a schematic of a four-wheel drive vehicle equipped with the power transmission device of FIG. 1 and shown in a third drive mode.

Turning now to FIG. 4, the power transmission device 30 is shown operating in a third or electric motor assist drive mode. In the third drive mode, the friction clutch 74 is at least partially engaged such that torque is transferred from the input shaft 70 to the output shaft 72 such that the drive train 10 is operating in a conventional on-demand all wheel drive mode. In the third drive mode as shown in FIG. 4, the electric motor 56 is also active. The electric motor 56 can provide a positive torque input to the drum 100 resulting in an increase in net drive torque being transferred to the output shaft 72. In some circumstances, the electric motor 56 can alternatively provide a negative torque onto the drum 100 such that a reduced output torque is transferred to the output shaft 72. In either scenario, the controller 50 can communicate a signal to the electric motor 56 that corresponds with the desired positive or negative torque input.

Figure 5:
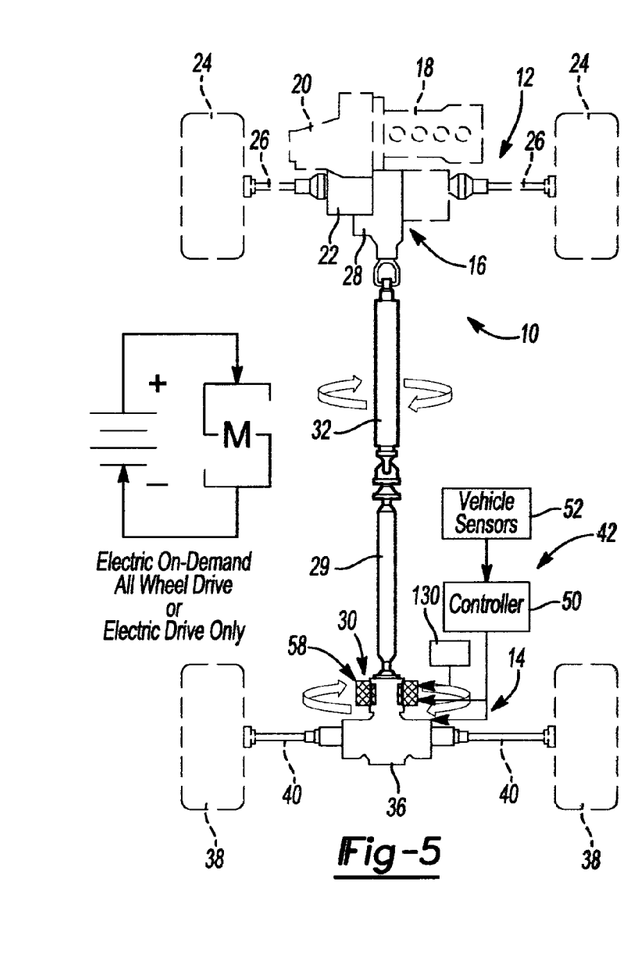
FIG. 5 is a schematic of a four-wheel drive vehicle equipped with the power transmission device of FIG. 1 and shown in a fourth drive mode.

With reference now to FIG. 5, the power transmission device 30 is shown in a fourth or electric drive mode. In the fourth drive mode, the power transmission device 30 is inactive such that the friction clutch 74 is not engaged and drive torque is not communicated from the input shaft 70 to the output shaft 72. However, in the fourth drive mode, drive torque can be communicated to the output shaft 72 solely from the electric motor 56. In this regard, in the fourth drive mode, the controller 50 can operate the power transmission device 30 in an electric on-demand all wheel drive mode where the front wheels 24 are provided drive torque from the engine 18 while the rear wheels 38 are provided drive torque solely through the electric motor 56. Additionally, in the fourth drive mode, the controller 50 can operate the drive train 10 such that the only wheels being supplied with drive power are the rear wheels 38 that are powered solely from the electric motor 56.

Figure 6:
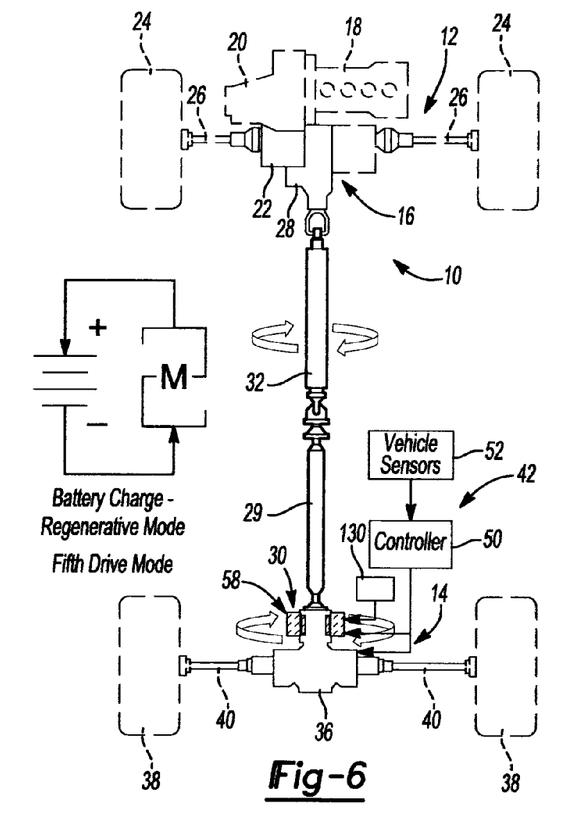
FIG. 6 is a schematic view of a four-wheel drive vehicle equipped with the power transmission device of FIG. 1 and shown in a fifth drive mode.

With reference now to FIG. 6, the power transmission device 30 is shown operating in a fifth or regenerative drive mode. In the fifth drive mode, the friction clutch 72 is disengaged such that drive torque is not transmitted from the input shaft 70 to the output shaft 72. In the fifth drive mode, the electric motor 56 can be used in a battery charge, regenerative mode. In this regard, the electric motor 56 can be used at higher vehicle speeds for braking while utilizing the braking input as a regenerative input to the battery 130. Additionally or alternatively, the electric motor 56 can be used at low vehicle speeds such as to maintain a vehicle speed.

Figure 7:
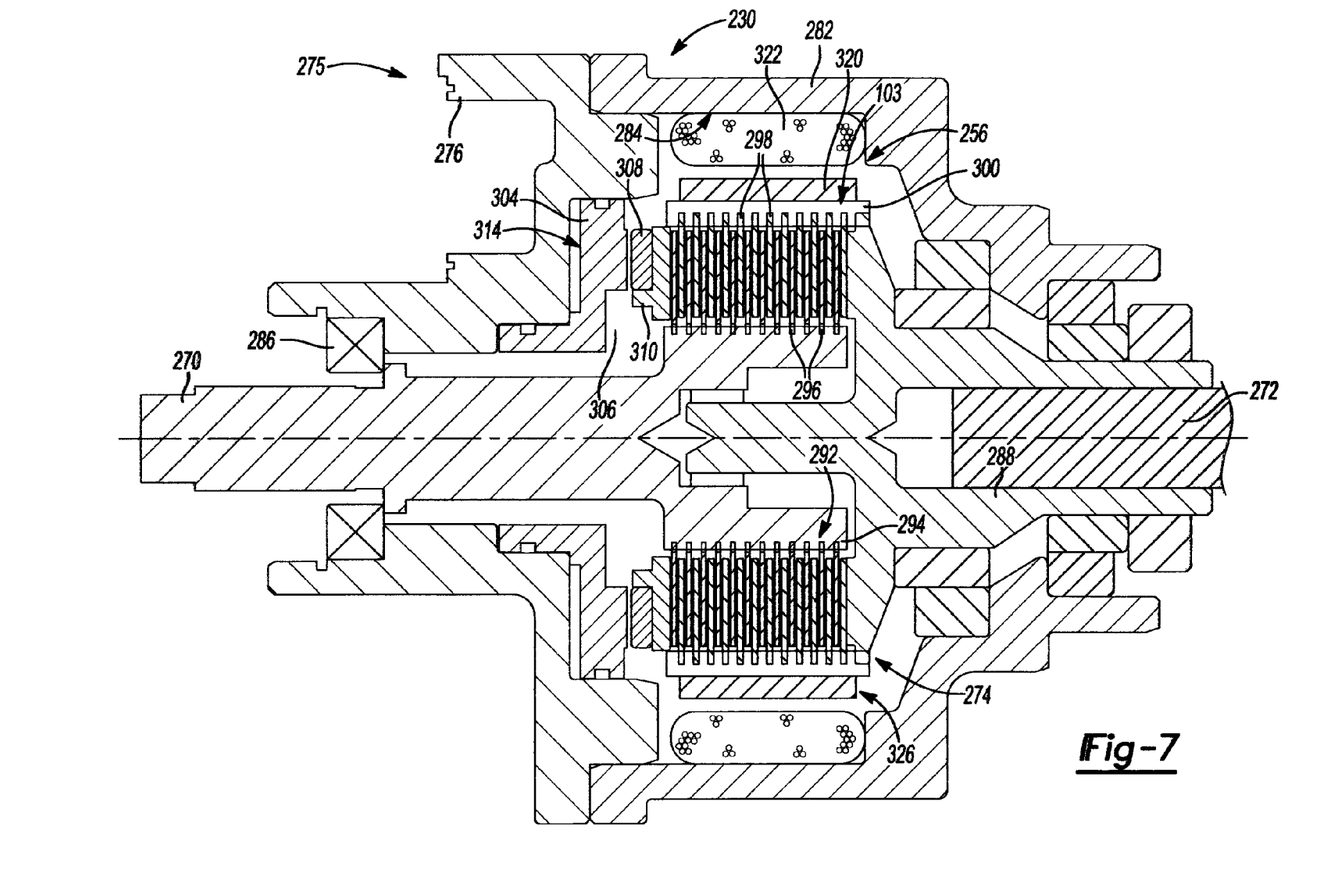
FIG. 7 is a cross-sectional side view of a power transmission device incorporating an electric motor constructed in accordance to other features of the present teachings.

With reference now to FIG. 7, a power transmission device 230 constructed in accordance to additional features of the present teachings is shown. The power transmission device 230 includes similar features as discussed above with respect to the power transmission device 30. In this regard, similar components are identified with reference numerals increased by 200.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
 a power transmission device having a housing, a friction clutch, an input member, an output member and a hydraulic powerpack, the housing defining a hydraulic conduit and an annular piston bore, the friction clutch being received in the housing and selectively transmitting torque between the input member and the output member, the friction clutch including a drum an annular piston received in the annular piston bore, the hydraulic powerpack being fixedly coupled to the housing and configured to transmit pressurized hydraulic fluid through the hydraulic conduit to the annular piston bore;
 first and second axle shafts;
 a differential that is configured to transmit drive torque from the output member to the first and second axle shafts; and
 an electric motor comprising a coil and a plurality of magnets, wherein the coil is disposed on one of the housing and the drum and the magnets are disposed on the other one of the housing and the drum.

2. The axle assembly of claim 1 wherein the coil is arranged on a cylindrically shaped sidewall of the housing and the magnets are disposed on an outer cylindrical surface of the drum.

3. The axle assembly of claim 1 wherein the frictional clutch is a wet clutch.

4. The axle assembly of claim 1 wherein the power transmission device is configured to operate in an electric motor assist drive mode wherein the electric motor is energized and provides a positive torque input to the output member.

5. The axle assembly of claim 1 wherein the power transmission device is configured to operate in an electric motor assist drive mode wherein the electric motor is energized and provides a negative torque input to the output member.

6. The axle assembly of claim 4 wherein the power transmission device is further configured to operate in an electric drive mode wherein the frictional clutch of the power transmission device is not coupled and wherein the electric motor is energized and provides a sole torque input to the output member.

7. The axle assembly of claim 6 wherein the power transmission device is further configured to operate in a regenerative drive mode wherein the electric motor provides a braking input to the power transmission device and wherein the braking input provides a regenerative input to a battery.

8. The axle assembly of claim 1 wherein the frictional clutch includes a first clutch member and a second clutch member received in the drum, one of the first clutch member or the second clutch member operatively coupled to the input member and the other of the first and second clutch member operatively coupled to the output member.

9. An axle assembly comprising:
a power transmission device having a housing, a friction clutch, an input member, an output member and a hydraulic powerpack, the housing defining a cylindrically shaped sidewall, a hydraulic conduit and an annular piston bore, the friction clutch being received in the housing and having an annular piston, which is received in the annular piston bore, a first clutch member and a second clutch member received in a drum, one of the first clutch member or the second clutch member operatively coupled to the input member and the other of the first and second clutch member operatively coupled to the output member, the friction clutch being configured to selectively transmit torque between the input member and the output member, the hydraulic powerpack being fixedly coupled to the housing and configured to transmit pressurized hydraulic fluid through the hydraulic conduit to the annular piston bore;
first and second axle shafts;
a differential that is configured to transmit drive torque from the output member to the first and second axle shafts; and
an electric motor comprising a coil and a plurality of magnets, wherein one of the coil and magnets is disposed on the housing and the other one of the coil and magnets is disposed on the drum.

10. The axle assembly of claim 9 wherein the first and second axle shafts are rear axle shafts.

11. The axle assembly of claim 9 wherein the coil is arranged on the cylindrically shaped sidewall of the housing and the magnets are disposed on an outer cylindrical surface of the drum.

12. The axle assembly of claim 9 wherein the frictional clutch is a wet clutch.

13. The axle assembly of claim 9 wherein the power transmission device is configured to operate in an electric motor assist drive mode wherein the electric motor is energized and provides a positive torque input to the output member.

14. The axle assembly of claim 9 wherein the power transmission device is configured to operate in an electric motor assist drive mode wherein the electric motor is energized and provides a negative torque input to the output member.

15. The axle assembly of claim 12 wherein the power transmission device is further configured to operate in an electric drive mode wherein the frictional clutch of the power transmission device is not coupled and wherein the electric motor is energized and provides a sole torque input to the output member.

16. The axle assembly of claim 15 wherein the power transmission device is further configured to operate in a regenerative drive mode wherein the electric motor provides a braking input to the power transmission device and wherein the braking input provides a regenerative input to a battery.

17. The axle assembly of claim 9 wherein the differential is a rear differential.

\* \* \* \* \*